United States Patent
Pattichis et al.

(10) Patent No.: US 11,076,153 B2
(45) Date of Patent: Jul. 27, 2021

(54) SYSTEM AND METHODS FOR JOINT AND ADAPTIVE CONTROL OF RATE, QUALITY, AND COMPUTATIONAL COMPLEXITY FOR VIDEO CODING AND VIDEO DELIVERY

(71) Applicant: STC.UNM, Albuquerque, NM (US)

(72) Inventors: Marios Stephanou Pattichis, Albuquerque, NM (US); Yuebing Jiang, Santa Clara, CA (US); Cong Zong, Albuquerque, NM (US); Gangadharan Esakki, Albuquerque, NM (US); Venkatesh Jatla, Albuquerque, NM (US); Andreas Panayides, Strovolos (CY)

( * ) Notice: Subject to any disclaimer, the term of this patent is extended or adjusted under 35 U.S.C. 154(b) by 0 days.

(21) Appl. No.: 15/747,982

(22) PCT Filed: Jul. 31, 2016

(86) PCT No.: PCT/US2016/044942
§ 371 (c)(1),
(2) Date: Jan. 26, 2018

(87) PCT Pub. No.: WO2017/023829
PCT Pub. Date: Feb. 9, 2017

(65) Prior Publication Data
US 2018/0220133 A1 Aug. 2, 2018

Related U.S. Application Data

(60) Provisional application No. 62/199,438, filed on Jul. 31, 2015.

(51) Int. Cl.
H04N 19/127 (2014.01)
H04N 19/172 (2014.01)
(Continued)

(52) U.S. Cl.
CPC ......... *H04N 19/127* (2014.11); *H04N 19/119* (2014.11); *H04N 19/126* (2014.11);
(Continued)

(58) Field of Classification Search
CPC .. G06F 15/177; H04N 19/127; H04N 19/126; H04N 19/149; H04N 19/119; H04N 19/172; H04N 19/147
(Continued)

(56) References Cited

U.S. PATENT DOCUMENTS 6,426,772 B1 * 7/2002 Yoneyama ............. H04N 19/61
375/240.02
8,798,137 B2 * 8/2014 Po ......................... H04N 19/176
375/240.02
(Continued)

OTHER PUBLICATIONS

Dynamically Reconfigurable Architecture System for Time-varying Image Constraints (DRASTIC) for HEVC Intra Encoding, 2013 , IEEE, pp. 1112-1116, by Yuebing Jiang, Gangadharan Esakki, and Marios Pattichis.*
(Continued)

*Primary Examiner* — Tung T Vo
(74) *Attorney, Agent, or Firm* — Valauskas Corder LLC

(57) ABSTRACT

System and methods for the joint control of reconstructed video quality, computational complexity and compression rate for intra-mode and inter-mode video encoding in HEVC. The invention provides effective methods for (i) generating a Pareto front for intra-coding by varying CTU parameters and the QP, (ii) generating a Pareto front for inter-coding by varying GOP configurations and the QP, (iii) real-time and offline Pareto model front estimation using regression methods, (iv) determining the optimal encoding configurations based on the Pareto model by root finding and
(Continued)

local search, and (v) robust adaptation of the constraints and model updates at both the CTU and GOP levels.

18 Claims, 14 Drawing Sheets

(51) Int. Cl.
*H04N 19/149* (2014.01)
*H04N 19/119* (2014.01)
*H04N 19/126* (2014.01)
*H04N 19/147* (2014.01)

(52) U.S. Cl.
CPC ......... *H04N 19/147* (2014.11); *H04N 19/149* (2014.11); *H04N 19/172* (2014.11)

(58) Field of Classification Search
USPC ........................................ 375/240.15, 240.03
See application file for complete search history.

(56) References Cited

U.S. PATENT DOCUMENTS

| | | | | |
|---|---|---|---|---|
| 8,934,538 B2* | 1/2015 | Yang | ............... | H04N 19/15 375/240.02 |
| 9,111,059 B2 | 8/2015 | Pattichis et al. | | |
| 9,542,198 B2 | 1/2017 | Pattichis et al. | | |
| 2006/0133480 A1* | 6/2006 | Chang | ................... | H04N 19/172 375/240.03 |
| 2009/0175330 A1* | 7/2009 | Chen | ................... | H04N 19/115 375/240.01 |
| 2011/0164677 A1* | 7/2011 | Lu | ....................... | H04N 19/176 375/240.02 |
| 2011/0235928 A1* | 9/2011 | Strom | ................... | H04N 19/115 382/233 |
| 2011/0305144 A1* | 12/2011 | Sethakaset | ......... | H04B 7/15592 370/246 |
| 2012/0287987 A1* | 11/2012 | Budagavi | ............. | H04N 19/587 375/240.02 |
| 2013/0094565 A1* | 4/2013 | Yang | ..................... | H04N 19/105 375/240.02 |
| 2013/0129241 A1* | 5/2013 | Wang | ..................... | H04N 19/19 382/233 |
| 2013/0272383 A1* | 10/2013 | Xu | ....................... | H04N 19/172 375/240.03 |
| 2014/0016693 A1* | 1/2014 | Zhang | ............. | H04N 21/23439 375/240.02 |
| 2014/0161177 A1* | 6/2014 | Sim | ........................ | H04N 19/70 375/240.03 |
| 2014/0192862 A1* | 7/2014 | Flynn | ................... | H04N 19/117 375/240.03 |
| 2015/0030068 A1* | 1/2015 | Sato | ....................... | H04N 19/70 375/240.03 |
| 2015/0049805 A1* | 2/2015 | Zhou | ................... | H04N 19/176 375/240.03 |
| 2015/0092840 A1* | 4/2015 | Mochizuki | ........... | H04N 19/593 375/240.03 |
| 2015/0103892 A1* | 4/2015 | Zhou | ................... | H04N 19/117 375/240.03 |
| 2015/0110181 A1* | 4/2015 | Saxena | ................ | H04N 19/176 375/240.12 |
| 2015/0172661 A1* | 6/2015 | Dong | ..................... | H04N 19/51 375/240.03 |
| 2015/0215631 A1* | 7/2015 | Zhou | ..................... | H04N 19/436 375/240.02 |
| 2015/0271531 A1* | 9/2015 | Wen | ........................ | H04N 19/52 375/240.16 |
| 2015/0326883 A1* | 11/2015 | Rosewarne | .......... | H04N 19/119 375/240.18 |
| 2015/0373328 A1* | 12/2015 | Yenneti | ................ | H04N 19/12 375/240.03 |
| 2016/0050422 A1* | 2/2016 | Rosewarne | .......... | H04N 19/105 375/240.12 |
| 2016/0088298 A1* | 3/2016 | Zhang | ................... | H04N 19/146 375/240.03 |
| 2016/0094855 A1* | 3/2016 | Zhou | ..................... | H04N 19/176 375/240.12 |
| 2016/0127733 A1* | 5/2016 | Wan | ...................... | H04N 19/127 375/240.02 |
| 2016/0156917 A1* | 6/2016 | Ugur | ...................... | H04N 19/33 375/240.08 |
| 2016/0173875 A1* | 6/2016 | Zhang | ................... | H04N 19/436 375/240.03 |
| 2016/0295217 A1* | 10/2016 | Suzuki | ................... | H04N 19/70 |
| 2016/0314603 A1 | 10/2016 | Carranza et al. | | |
| 2016/0316215 A1* | 10/2016 | Minoo | ................. | H04N 19/132 |
| 2017/0013261 A1* | 1/2017 | Lin | ..................... | H04N 19/176 |
| 2018/0184089 A1* | 6/2018 | Zhang | ................... | H04N 19/146 |

OTHER PUBLICATIONS

Overview of the High Efficiency Video Coding (HEVC) Standard, Gary J. Sullivan, Fellow, IEEE, Jens-Rainer Ohm, Member, IEEE, Woo-Jin Han, Member, IEEE, and Thomas Wiegand, Fellow, IEEE, IEEE Transactions on Circuits and Systems for Video Technology, vol. 22, No. 12, Dec. 2012.*
Dynamic Switching of GOP Configurations in High Efficiency Video Coding (HEVC) using Relational Databases for Multi-objective Optimization, Gangadharan Esakki, Sep. 12, 2014.*
Gangadharan Esakki et al., "Dynamic Switching of GOP Configurations in High Efficiency Video Coding (HEVC) using Relational Databases for Multi-objective Optimization." The University of New Mexico, 2014. website http://digitalrepository.unm.edu/ece_etds/80.
Jiang et al., "Dynamically reconfigurable architecture system for time-varying image constraints (drastic) for hevc intra encoding", Asilomar Conference on Signals Systems and Computers, pp. 1112-1116, Nov. 2013.
Jiang et al., "Dynamically reconfigurable DCT architectures based on bitrate power and image quality considerations", 19th IEEE International Conference on Image Processing (ICIP), pp. 2465-2468, 2012.
Jiang et al., "Dynamically reconfigurable architecture system for time-varying image constraints (drastic) for motion jpeg",J Real-Time Image Proc (2018) 14: 395. https://doi.org/10.1007/s11554-014-0460-8.

* cited by examiner

1: *Estimate* budgets for T, Q, R for all CTUs.
2: *Estimate* QP and Config using initial model.

▷ Encode frame by iterating through the CTUs.
3: for each CTU in current frame do

▷ Robust allocation T, Q, R within available budgets.
4:    *Allocate* T, Q, R based on available budgets.
5:    *Update* remaining budgets for T, Q, R.
6:    if any remaining budget $< 0$ then
      ▷ Adjust budget to minimize the violation.
7:       *ReAllocate* CTU budgets using a fraction
         of the remaining total frame budget.
8:    end if

▷ Robust model update
9:    *Update* model using three neighboring CTUs.
10:   if model update failed then
11:      *Update* model with neighboring CTU model
      that gave best prediction.
12:   end if cont ...

FIG. 5A cont ...

▷ Robust parameter estimation and optimization.
13:     *Estimate* QP and Config based on the model.
14:     *Solve* optimization problem using *local search*.
15:     if either QP or Config is out of range then
        ▷ Update constraints and fix encodings
16:        *Update* constraints and estimate new estimates of QP and Config.
17:        *Constrain* QP to be within ±4 of neighboring CTUs.
18:        *Enforce* QP and Config within valid ranges.
19:     end if ▷ Encode CTU and store encoding parameters.
20:     *Encode* CTU using QP and Config.
21:     *Compute* T, Q, R for current CTU.
22:     *Save* QP, Config, T, Q, R and CTU location for model updates.
23: end for

FIG. 5B

| Mode | Objective (minimum) |
|---|---|
| Minimum Rate | $\text{norm}(\text{abs}(\text{MSE}_{est} - \text{MSE}_{target}))$ $+\text{norm}(\text{abs}(\text{Time}_{est} - \text{Time}_{target}))$ |
| Minimum Complexity | $\text{norm}(\text{abs}(\text{MSE}_{est} - \text{MSE}_{target}))$ $+\text{norm}(\text{abs}(\text{BPS}_{est} - \text{BPS}_{target}))$ |
| Maximum Quality | $\text{norm}(\text{abs}(\text{Time}_{est} - \text{Time}_{target}))$ $+\text{norm}(\text{abs}(\text{BPS}_{est} - \text{BPS}_{target}))$ |

FIG. 8

▷ Use CTU SSE and times T to estimate $a, b$.
1: if $(\text{SSE}_{top}\ !=\ \text{SSE}_{left})$ and $(\text{T}_{top}\ !=\ \text{T}_{left})$ then
2:     $b = \log(\text{T}_{top}/\text{T}_{left}) / \log(\text{SSE}_{top}/\text{SSE}_{left})$
3:     $a = \text{T}_{top}/\text{SSE}_{top}^{b}$
4: end if

FIG. 9

▷ Estimate ratios associated with current CTU.
1: $T_{used} \leftarrow T/T_{target,i}$
2: $SSE_{used} \leftarrow SSE/SSE_{target,i}$
3: if ($SSE_{used} > 1$) and ($T_{used} > 1$) then
   ▷ Above the target.
4:     if ($SSE_{used} \leq T_{used}$) then
       ▷ Reduce time to meet the curve.
5:         $T_{target,i} = a \cdot Q_{target}^{b}$
6:     else
       ▷ Reduce SSE to meet the curve.
7:         $Q_{target} = (T_{target}/a)^{1/b}$
8:     end if
9: else
   ▷ Below the target.
10:    if ($SSE_{used} \geq T_{used}$) then
       ▷ Increase time to meet the curve.
11:        $T_{target} = (Q_{target}/a)^{1/b}$
12:    else
       ▷ Increase SSE to meet the curve.
13:        $Q_{target} = a \cdot T_{target}^{b}$
14:    end if
15: end if

FIG. 10

▷ Use CTU SSE and bitrates R to estimate $a, b$.
1: if $(SSE_{top} \mathrel{!=} SSE_{left})$ and $(R_{top} \mathrel{!=} R_{left})$ then
2:     $b = \log(SSE_{top}/SSE_{left})/\log(R_{top}/R_{left})$
3:     $a = SSE_{top}/R_{top}^{b}$
4: end if

FIG. 11

1: $R_{used} \leftarrow R/R_{target,i}$
2: $SSE_{used} \leftarrow SSE/SSE_{target,i}$
3: if $(R_{used} > 1)$ and $(SSE_{used} > 1)$ then
4:     if $(SSE_{used} \leq R_{used})$ then
5:         $R_{target} = (Q_{target}/a)^{1/b}$
6:     else
7:         $Q_{target} = a \cdot R_{target}^{b}$
8:     end if
9: else
10:     if $(SSE_{used} \geq R_{used})$ then
11:         $R_{target} = (Q_{target}/a)^{1/b}$
12:     else
13:         $Q_{target} = a \cdot R_{target}^{b}$
14:     end if
15: end if

FIG. 12

1: ▷ Use CTU encoding times T and rates R
2: ▷ to estimate $a, b$ for the model.
3: if $(T_{top} != T_{left}))$ and $(R_{top} != R_{left})$ then
4: $\quad b = \log(T_{top}/T_{left})/\log(R_{top}/R_{left})$
5: $\quad a = T_{top}/R_{top}^b$
6: end if

FIG. 13

1: $T_{used} \leftarrow T/T_{target,i}$
2: $R_{used} \leftarrow R/R_{target,i}$
3: if $(R_{used} > 1)$ and $(T_{used} > 1)$ then
4: $\quad$ if $(T_{used} \leq R_{used})$ then
5: $\quad\quad T_{target} = a \cdot R_{target}^b$
6: $\quad$ else
7: $\quad\quad R_{target} = (T_{target}/a)^{1/b}$
8: $\quad$ end if
9: else
10: $\quad$ if $(T_{used} \geq R_{used})$ then
11: $\quad\quad R_{target} = (T_{target}/a)^{1/b}$
12: $\quad$ else
13: $\quad\quad T_{target} = a \cdot R_{target}^b$
14: $\quad$ end if
15: end if

FIG. 14

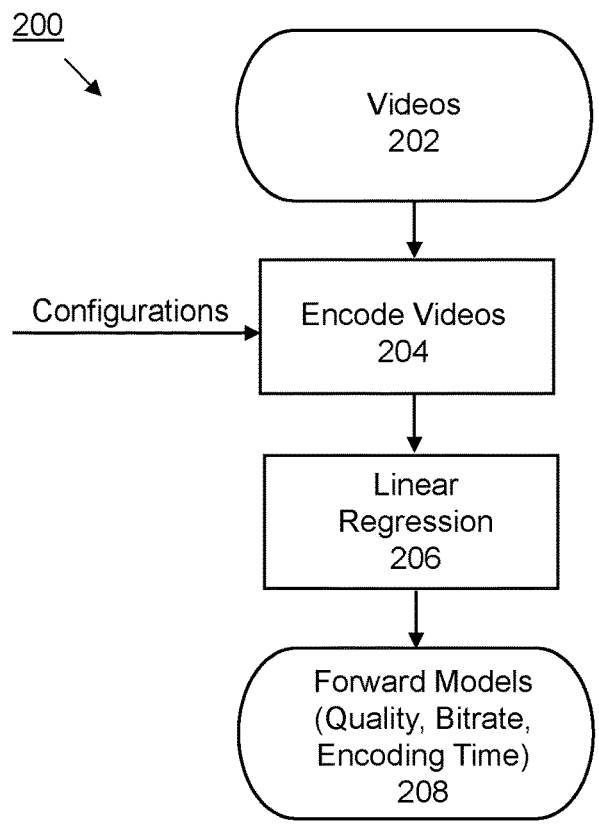

FIG. 17 function VideoEncodingAndForwardModels
    Input: input videos Vd, configuration files Cnf, parameter values Prmval.
    Output: equations of forward models Fwdeq
    for (eachVideo in Vd)
        for (eachConfigutation in Cnf)
            *Encode* video and *extract* parameter values in terms of QP, SSIM, Frame Rate and Bitrate and store in Prmval.
        end for
    end for
    for (SSIM/Frame Rate/Bitrate in Prmval)
        *Train* and *validate* forward individual regression models for SSIM, Frame Rate and Bitrate. For each model *create* an equation in *store* it to Fwdeq.
    end for
end function

FIG. 18 function AdaptiveEncoding
   Input: equations of forward models Fwdeq, parameter values Prmval, group of pictures GOP, time varying constraints Tvc, parameter constraints Prmcns, forward models predictions Fwdmdpd.
   Output: new encoding parameters Nencpm.
   #Time varying constraints initialization
   *Initialize* SSIM constraint in Tvc
   *Initialize* Frame Rate constraint in Tvc
   *Initialize* Bitrate constraint in Tvc
   for (eachGop in GOP)
    if (current Tvc != previous Tvc) then
      *Create* Prmcns for Tvc
    else
      Use empty current setting
    end if
    for (eachForwardModel in Fwdeq)
      *Input* Prmcns in eachForwardModel.
      *Use* Newton's algorithm to *predict* QP values as Fwdmdpd and *create* initial candidate configurations
      for (eachForwardModelPrediction in Fwdmdpd)
        *Create* inverse model equation and optimal solution and *predict* quantization parameter value that meets SSIM, Frame Rate and Bitrate constraints. These are the final candidate configurations
      end for
    end for
    *Select* optimal configuration and *store* values to Nencpm.
   end for
end function

FIG. 20

SYSTEM AND METHODS FOR JOINT AND ADAPTIVE CONTROL OF RATE, QUALITY, AND COMPUTATIONAL COMPLEXITY FOR VIDEO CODING AND VIDEO DELIVERY

CROSS-REFERENCE TO RELATED APPLICATIONS

This application claims the benefit of U.S. Provisional Patent Application No. 62/199,438 filed Jul. 31, 2015, incorporated by reference.

FEDERALLY-SPONSORED RESEARCH OR DEVELOPMENT

This invention was made with government support under CNS1422031 awarded by the National Science Foundation (NSF). The government has certain rights in the invention.

FIELD OF THE INVENTION

The invention relates generally to computer software for video communications. More specifically, the invention relates to image processing, intra-mode video encoding, and inter-mode video encoding that is compatible with the high-efficiency video coding (HEVC) standard.

The following patent applications are incorporated by reference: U.S. patent application Ser. No. 14/069,822 filed Nov. 1, 2013, now U.S. Pat. No. 9,111,059; U.S. patent application Ser. No. 14/791,627 filed Jul. 6, 2015; and International Patent Application PCT/US14/70371 filed Dec. 15, 2014, now U.S. patent application Ser. No. 15/103,977.

BACKGROUND OF THE INVENTION

Computer systems include hardware and software. Hardware includes the physical components that make up a computer system. Software includes programs and related data that provide the instructions for telling computer hardware what to do and how to do it.

Computer system hardware includes a processor that permits access to a collection of computing resources and components that can be invoked to instantiate a machine, process, or other resource for a limited or defined duration. A processor may be special purpose or general-purpose digital signal processor configured to carry out the instructions of a computer program by performing the basic arithmetic, logical, control and input/output (I/O) operations specified by the instructions. Specifically, a processor—or central processing unit (CPU)—includes a processing unit and control unit (CU). Most modern CPUs are microprocessors contained on a single integrated circuit (IC) chip. A computer system also includes non-transitory computer-readable storage medium such as a main memory, for example random access memory (RAM).

Computer systems may include any device through the use of which implements the methods according to the invention, for example as computer code. Computer systems may include, for example, traditional computer, portable computer, handheld device, mobile phone, personal digital assistant, smart hand-held computing device, cellular telephone, or a laptop or netbook computer, hand held console or MP3 player, tablet, or similar hand held computer device, such as an iPad® or iPhone®, and embedded devices or those that contain a special-purpose computing system.

The design of most video coding standards is primarily aimed at having the highest compression efficiency, or ability to encode video at the lowest possible bit rate while maintaining a certain level of video quality. High-efficiency video coding (HEVC), also known as H.265, is a video compression standard that has provided substantial improvements to video compression. Compared to H.264, HEVC aims at a 50% bit rate reduction at equivalent video quality levels. Unfortunately, bitrate performance improvements come at substantial increase in computational complexity.

HEVC benefits from the use of larger coding tree unit (CTU) sizes to increase coding efficiency while also reducing decoding time. HEVC also uses other coding tools. These coding tools include context-adaptive binary arithmetic coding (CABAC) as the only entropy encoder method, transform units (TUs) to code the prediction residual, recursive coding, complex intra-prediction modes and asymmetric inter prediction unit division. In addition, two loop filters are applied sequentially, with the deblocking filter (DBF) applied first and the sample adaptive offset (SAO) filter applied afterwards.

At a higher-level, for inter encoding, HEVC relies on the use of Group Of Pictures (GOP) configurations to achieve different levels of performance. Video encoding efficiency depends heavily on the GOP configurations.

There has been strong research interest in reducing HEVC encoding complexity for both inter- and intra-coding. Inter-coding compresses pictures based on their GOP configuration. Intra-coding compresses each picture independent of the other. For reducing the computational complexity for inter coding, for example, use of different configuration modes have been introduced. Methods that have been used for reducing the computational complexity for intra-coding include the use of a rough mode set (RMS), gradient based intra-prediction, and coding unit (CU) depth control. Unfortunately, these prior approaches did not take into account that video compression requirements can jointly vary with network conditions, energy/power constraints, or varying expectations of video quality. Thus, it is not sufficient to reduce computational complexity without considering the implications on bitrate and video quality.

Although HEVC is considered a high-efficiency codec, there is a need to jointly control bitrate, video quality, and computational complexity for both intra-coding and inter-coding. The invention satisfies this demand.

SUMMARY OF THE INVENTION

The invention is directed to adaptive methods that can adjust video compression parameters and jointly control computational complexity, image quality, and bandwidth (or bitrate). The system and methods simultaneously minimize computational complexity, maximize image quality, and minimize bandwidth subject to constraints on available energy/power, bandwidth, and the minimum level of acceptable video quality. The proposed system and methods extend the previously filed patent applications that are cited above by providing effective methods for: (i) generating a Pareto front for intra-coding by varying CTU parameters and the QP, (ii) generating a Pareto front for inter-coding by varying GOP configurations and the QP, (iii) real-time and offline Pareto model front estimation using regression methods, (iv) determining the optimal encoding configurations based on the Pareto model by root finding and local search, and (v) robust adaptation of the constraints and model updates at both the CTU and GOP levels. The system and methods apply to both inter-coding (each picture is compressed independent of the other) and intra-coding (pictures are compressed in groups).

Advantageously, the system and methods of the invention can be applied to both intra-coding and inter-coding for the high-efficiency video coding (HEVC), previous, and future video encoding standards.

The invention designs methods that can solve $\min_{c \in C}$ (T, R, −Q) with T representing encoding time per frame, R representing the number of bits per sample, C representing the set of all possible video encoding configurations, and Q representing a measure of video quality (e.g., PSNR of average SSIM)—the negative sign expressing maximum quality (and hence minimize −Q). The multi-objective surface of solutions that satisfy $\min_{c \in c}$ (T, R, −Q) forms the Pareto front. The invention describes optimization methods that select encoding configurations c ∈ C that produces points on the Pareto front.

The invention uses a controller embedded in software to handle the optimization process. The controller is provided with measurements of encoding time, rate, image quality and constraints (e.g., available network bandwidth, available battery energy, user determined quality). For intra-coding, the controller dynamically adjusts CTU configurations and the quantization parameter (QP). For inter-coding, the controller dynamically adjusts the GOP configurations and the QP. The dynamic control is used to realize the optimization modes listed above in the approved patent application.

The invention provides constraint optimization solutions to the minimum computational complexity mode, the maximum quality mode, and the minimum bitrate mode. For example, video quality may be related to application-modality level adaptation, bitrate demands may be related to wireless network adaptation and encoding frame rate may relate to device adaptation for real-time operation. For each mode, one of the objectives (e.g., computational complexity, quality, or bitrate) is optimized, while suitable constraints are placed on the other two. For example, for the minimum computational complexity mode, the invention minimizes computational complexity of HEVC subject to constraints in bitrate and reconstruction quality. The constraint-optimization approach provides an extension to the use of bit constrained rate-distortion optimization by also minimizing or constraining computational complexity. Overall, the invention provides joint control of reconstructed video quality, computational complexity, and compression rate.

For intra-mode HEVC encoding, the approach uses a configuration parameter that controls the partitioning of the coding tree unit (CTU) so as to provide for finer control of the encoding process. By jointly sampling the quantization parameter (QP) and the CTU configuration mode, the approach generates a finely-sampled, Pareto-optimal, rate-quality-performance surface.

The quantization parameter (QP) and a quad-tree-depth oriented coding tree unit (CTU) configuration are adaptively controlled to deliver performance that is optimal in the complexity-rate-quality performance space. The invention employs a spatially adaptive model that uses neighboring configurations to estimate optimal values for QP and the coding tree unit configuration (CTU). More specifically, the invention provides a robust, spatially-adaptive control algorithm for solving the minimum bitrate, maximum quality, and minimum computational complexity optimization problems.

One object of the invention is Hierarchical coding unit (CU) partitioning for fine, joint control of rate-quality-performance. Intra-encoding control is achieved by controlling the minimum size of the coding unit (CU). The minimum size encoding parameter is used to ensure hierarchical partitioning. An increase in the minimum code size always results in better coding performance since there are more choices. Thus, increasing the minimum code size increases quality, increase computational complexity, and bitrate. Similarly, decreasing the minimum code size decreases quality, computational complexity, and bitrate.

Another object of the invention is static and dynamic control of rate-quality-performance. According to the invention, the rate-quality-performance surface depends on the minimum coding size and QP and uses the model to implement the minimum bitrate, maximum quality, and maximum performance modes. The approach also allows dynamic switching between modes. For example, using an HEVC standard test video and the dynamic reconfiguration between low, medium and high profiles proved to meet constraints—93% (low), 83% (medium), 93% (high)—, while delivering encoding time savings of 13%, 49% and 40% respectively.

The invention uses cross-validated regression to quickly build optimal models since thousands of possibilities do not need to be evaluated. A root finding algorithm is used to solve for the optimal values. These solutions are used by a relaxation procedure to find actual, integer-based, software parameters.

The invention also applies to inter-mode HEVC encoding. For inter-mode HEVC encoding, encoding efficiency depends heavily on the GOP configurations. Initially, for inter-mode HEVC encoding, the approach generates Pareto front models using an offline process. These models are used to adapt to time-varying constraints during real-time operation. Thus, an advantage of the invention is an offline process of video encoding including forward model creation and another advantage is the real-time adaptation to time-varying constraints—for example state of a wireless network to guarantee acceptable performance throughout a streaming session. Yet another advantage is the adaptation to constraints of modes—maximum video quality, minimum bitrate, maximum frame rate—on a GOP basis.

The invention and its attributes and advantages may be further understood and appreciated with reference to the detailed description below of one contemplated embodiment, taken in conjunction with the accompanying drawings.

BRIEF DESCRIPTION OF THE DRAWINGS

The preferred embodiments of the invention will be described in conjunction with the appended drawings provided to illustrate and not to limit the invention. FIGS. 1-16 are directed to intra-coding and FIGS. 17-20 are directed to inter-coding, where like designations denote like elements, and in which:

FIG. 1 is a block diagram of the intra-coding system and methods of the invention.

FIG. 2 illustrates a figure of the CTU partition control based on the config parameter according to the invention.

FIG. 3 is a plot diagram of a rate-distortion-complexity performance example for intra-coding according to the invention.

FIG. 4 illustrates a model update using 3 neighboring CTUs according to the invention.

FIG. 5A and FIG. 5B illustrates pseudo code of a common framework for intra-coding mode implementation according to the invention.

FIG. 6 illustrates a model update for the first row and the first column according to the invention.

FIG. 7 illustrates a performance constraint model update using neighbor CTUs according to the invention.

FIG. 8 illustrates a table of constraint violation objectives according to the invention.

FIG. 9 illustrates pseudo code of the time-quality relationship model update for minimum bitrate mode for intra-coding according to the invention.

FIG. 10 illustrates pseudo code of the constraint updates for minimum bitrate mode for intra-coding according to the invention.

FIG. 11 illustrates pseudo code of the quality-rate relationship model update for minimum computational complexity mode according to the invention.

FIG. 12 illustrates pseudo code of the constraint update for minimum computational complexity mode according to the invention.

FIG. 13 illustrates pseudo code of the time-rate relationship model update for maximum quality (minimum distortion mode) according to the invention.

FIG. 14 illustrates pseudo code of the constraint update for the minimum distortion mode according to the invention.

FIG. 15 illustrates a graph of the results of current methods of only using fixed CTU configuration while varying the QP only that cannot be used to achieve real-time control of rate-complexity-quality.

FIG. 16 illustrates a graph of the results using optimal QP and CTU configuration to achieve optimal and real-time control of rate-complexity-quality for intra-coding according to the invention.

FIG. 17 illustrates a flow chart of an offline process of video encoding and forward model creation for inter-coding according to the invention.

FIG. 18 illustrates pseudo code of the offline process of video encoding and forward model creation for inter-coding according to the invention.

FIG. 19 illustrates a flow chart of a real-time adaptation using time-varying constraints for inter-coding according to the invention.

FIG. 20 illustrates pseudo code of the real-time adaptation using time-varying constraints for inter-coding according to the invention.

DETAILED DESCRIPTION OF EMBODIMENTS OF THE INVENTION

Figure 1:
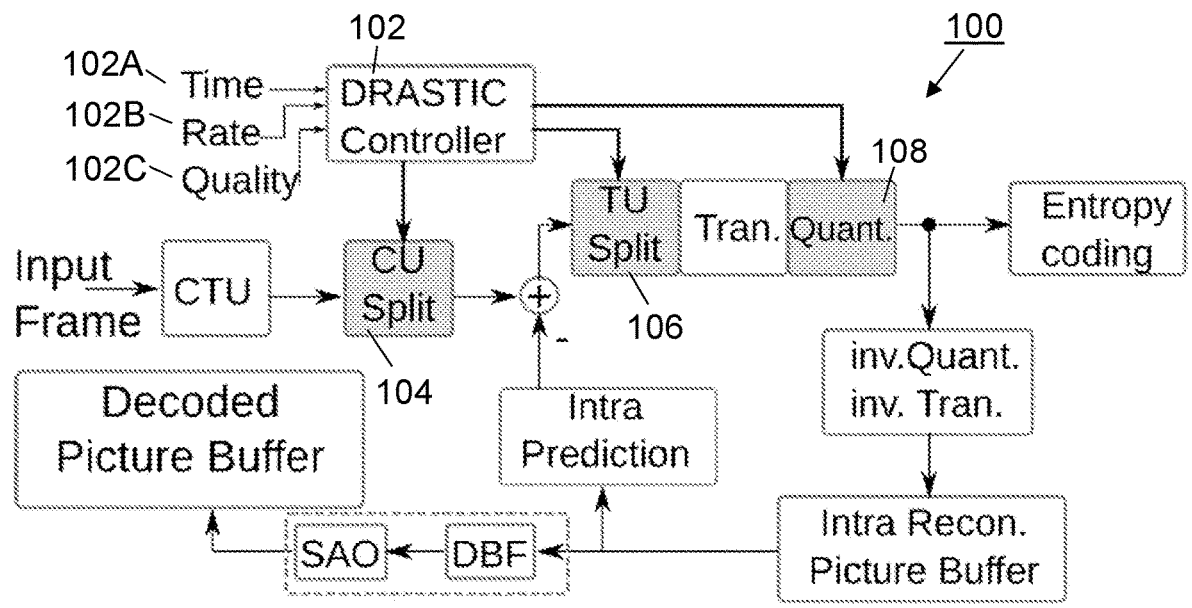

The following patent applications are incorporated by reference: U.S. patent application Ser. No. 14/069,822 filed Nov. 1, 2013, now U.S. Pat. No. 9,111,059; U.S. patent application Ser. No. 14/791,627 filed Jul. 6, 2015; and International Patent Application PCT/US14/70371 filed Dec. 15, 2014, now U.S. patent application Ser. No. 15/103, 977.

Dynamically reconfigurable frameworks offer unique advantages over non-dynamic systems. Dynamic adaptation provides the ability to adapt software and hardware resources to meet real-time varying requirements.

Embodiments of the invention include a system and methods for improving resource management in embedded computer systems. The managed resources (or objectives) may be directed to constraints. The term constraint is also referred to as real-time constraint or time-varying constraint. Time-varying constraints include, for example, constraints on the supplied power, required performance, accuracy levels, available bandwidth, and quality of output such as image reconstruction. It is contemplated that constraints can be generated by a user, by the system, or by data inputs.

During operation of a computer system, various states may exist in which one or more of the constraints is more important than the other. However, while allocating more resources to, for example, performance, the system strives to maintain optimal energy, power, and accuracy at the highest level without taking away from performance resources. As an example, digital video processing requires significant hardware resources to achieve acceptable performance.

The invention is directed to a system and methods for dynamic reconfiguration of software parameters for various applications such as digital signal, image, and video. For applications such as digital signal, image, and video, constraints may include, for example, dynamic power/energy consumption, performance, accuracy, bitrate, and quality of output or image reconstruction quality.

An optimal approach for jointly controlling rate-quality-complexity for both intra-mode and inter-mode is provided. According to the invention, an effective control mechanism model dynamically adjusts the quantization parameter (QP) and the coding tree unit (CTU) partition mechanism so as to achieve variable constraints on bitrate and video quality. The model is dynamically updated based on the input video.

More specifically, the invention provides a new, efficient implementation of the minimum computational complexity mode, maximum image quality mode, and the minimum bitrate mode. For all of the modes, video encoding configurations are specified so that they produce $\min_{c \in C}$ (T, R, −Q) with T representing encoding time per frame, R representing the number of bits per sample, C representing the set of all possible video encoding configurations, and Q representing a measure of video quality.

In order to jointly control T, R and Q, bounds can be provided on each one of them. For improving performance and guarantee computations within specific time limits, $T_{max}$ denotes an upper bound on the encoding time. Similarly, for communicating within a specific bandwidth, $R_{max}$ denotes an upper bound on the available bits per pixel. Then, to guarantee a minimum level of quality, $Q_{min}$ denote a lower bound on the encoded video quality. Thus, in general, it is desired to encode configurations that jointly satisfy: $(R \leq R_{max})$ & $(T \leq T_{max})$ & $(Q \geq Q_{min})$.

The following optimization modes are considered: maximum performance mode, minimum rate mode, maximum quality mode.

The maximum performance mode provides the best computational performance by minimizing encoding time. An acceptable, optimal encoding configuration is obtained by solving:

$$\min_{c \in C} T \text{ subject to: } (Q \geq Q_{min}) \text{ \& } (R \leq R_{max}) \qquad \text{Equation (1.1)}$$

The minimum rate mode reduces bitrate requirements without sacrificing quality or slowing down encoding time to an unacceptable level. The optimal configuration requires the solution of:

$$\min_{c \in C} R \text{ subject to: } (Q \geq Q_{min}) \text{ \& } (T \leq T_{max}) \qquad \text{Equation (1.2)}$$

The maximum quality mode: provides the best possible quality without exceeding bitrate or computational requirements. The optimal encoding is selected by solving:

$$\max_{c \in C} Q \text{ subject to: } (T \leq T_{max}) \text{ \& } (R \leq R_{max}) \qquad \text{Equation (1.3)}$$

An advantage of the invention is that the modes given by Equations (1.1)-(1.3) can be used to describe a large number of different, practical, scenarios. For example, for video streaming applications, $T_{max}$ can be set to $T_{max}=1/fps$ where fps denotes the number of frames per second at which the video is generated. As another example, adapting to a time-varying communications channel may be achieved by setting $R_{max}$ to the time-varying, available bandwidth.

An advantage of the invention includes the development of a control mechanism that solves the optimization problem given in Equation (1) for HEVC intra-encoding based on the Coding Tree Unit (CTU) level. Another advantage of the invention includes the effective implementation of the control mechanism using CTU performance models.

FIG. 1 is a block diagram of the system and methods of the intra-coding optimization process 100 according to the invention. A Dynamically Reconfigurable Architecture System for Time-varying Image Constraints (DRASTIC) controller or processor 102 is provided with measurements of encoding time 102A, rate 102B, and image quality 102C that the processor 102 uses to select methods for splitting the coding units (CU) 104 and transform units (TU) 106 and to set the quantization parameter (QP) 108 for the next incoming frame.

Optimal configuration management is based on scalable parametrization. The optimal configuration is based on a quantization parameter (QP) and a scalable parametrization of the CU tree based on config. It is noted that QP affects encoding time since larger QP values result in smaller bitrates, lower quality, and lower encoding times since there are fewer coefficients to encode. On the other hand, config is used for controlling the search space for specifying the coding unit sizes.

Figure 2:
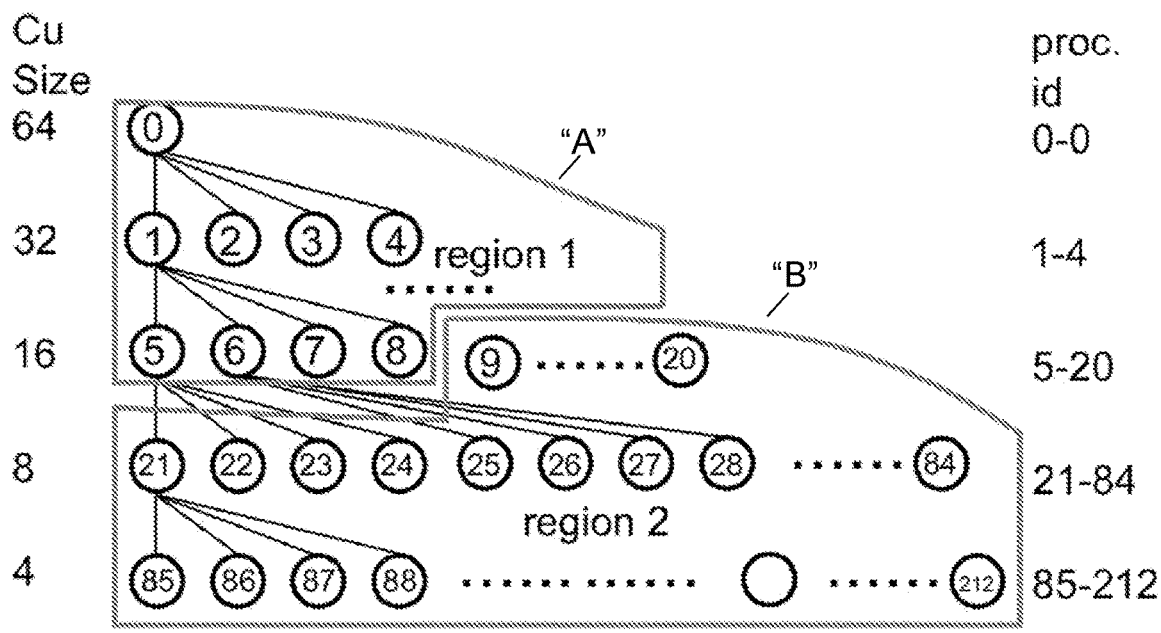

FIG. 2 illustrates a figure of Scalable Coding Tree Unit (CTU) partitioning following a breadth-first-search splitting pattern. Each block is recursively partitioned into four sub-blocks using a quadtree decomposition. The case of config=6 is shown in FIG. 2. The labeled partitioned block ids are also shown with the CU partition control based on the config parameter. The config parameter is allowed to vary from 0 to 13. Here, scalability is achieved by making sure that the search space uses a nested subset of the full partition tree. The quad-tree partition process is controlled using a process_id ("proc. id") as shown in FIG. 2, a depth first search (DFS). Here, the config parameter gets mapped to a maximum value of the process_id. Thus, partitioning beyond the maximum value of the process_id is not considered. For example, for config=0, any splitting is not considered. For config=1, the original 64×64 coding unit can be split into 4 32×32 regions, but splitting is allowed except for the first 32×32 region. The decision on whether splitting is optimal or not is decided using RD optimization. For config=6, the search tree is illustrated by "A" in FIG. 2. Tree space search is performed using depth first search (DFS). It is contemplated that the invention may be applied to TU control also, unless a split is needed, i.e. there is no 64×64 TU, a split to 32×32 TU is accepted. As shown by "B" in FIG. 2 any splitting for processes with id>9 is prohibited.

Figure 3:
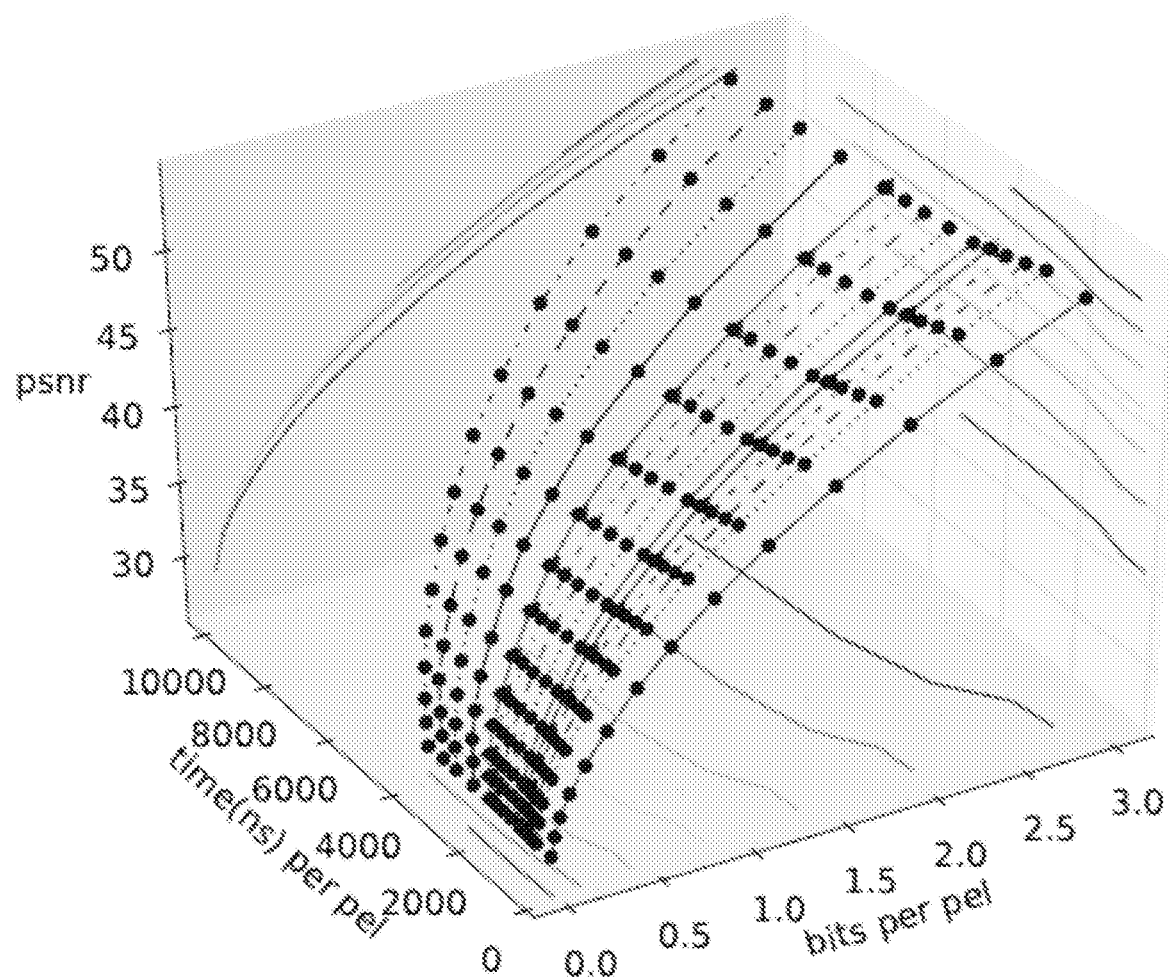

The proposed scalable approach can be used to generate a Time-Rate-Quality performance space as shown in FIG. 3. FIG. 3 is a plot diagram of a rate-distortion-complexity performance example according to the invention for intra-coding. For each plot the following is measured: (i) time using the number of seconds per sample (SPS), (ii) rate based on the number bits per sample (BPS), and (iii) quality using PSNR (dB).

The example is based on the first 6 frames of a video (832×480) referred to as the standard RaceHorsesC to produce the median objective surface plot shown in FIG. 3. To generate the space, QP is varied in the range of [6, 51) with a step of 3 and all 14 possible values are considered for config. In total, there are 340 possible combinations that have been verified to be optimal in the multi-objective sense (Pareto optimal). As expected, as config is increased better Rate-Distortion performance is obtained at the price of increased computational complexity. On the other hand, higher values of QP produce configurations that require lower bitrates with lower quality and reduced computational complexity.

A simple linear model is considered for describing the relationship between the objectives and the parameters.

$$Q = a_1 \cdot QP + b_1 \cdot \text{Config} + c_1$$

$$T = a_2 \cdot QP + b_2 \cdot \text{Config} + c_2$$

$$R = a_3 \cdot QP + b_3 \cdot \text{Config} + c_3 \quad \text{Equation (2)}$$

where Q is measured in terms of the mean squared error (MSE), T denotes the time in ns ($10^{-9}$ second) required for processing a single pixel, and R denotes the number of bits per sample.

The linear model of Equation (2) needs to be updated throughout the video frame. This model is dynamical and adjusts to the input sequence. The model may be updated based on local measurements.

The invention allocates time, quality, and rate to each CTU by controlling QP and Config. A feedback loop is used to provide measurements of time, quality, and rate to the control algorithm. The main control algorithm is presented in FIG. 4 and FIG. 5A, FIG. 5B. The basic idea is to encode each CTU independently while staying within the budget allocated to the entire frame.

Figure 4:
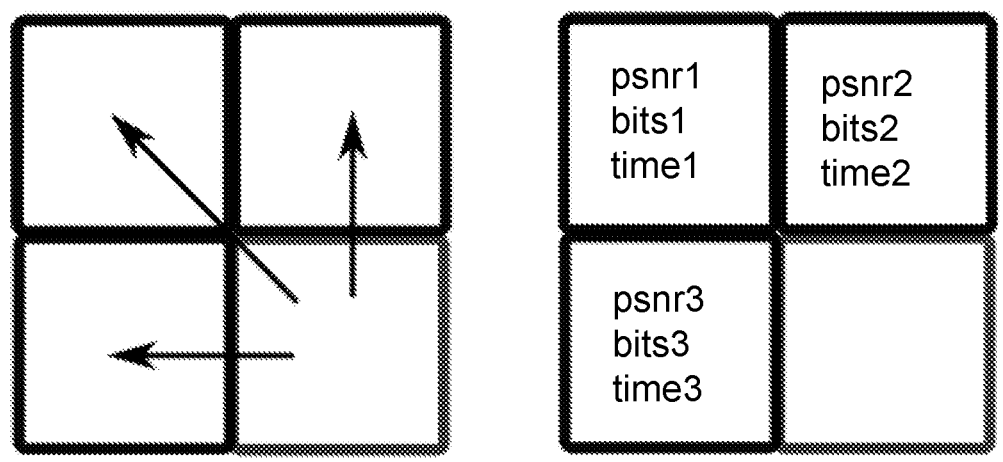

FIG. 4 illustrates a block diagram of a model update using 3 neighboring CTUs according to the invention. A shown in FIG. 4, the CTU is indexed as ($CTU_y$, $CTU_x$), the 3 neighbor CTUs are indexed as ($CTU_y$, $CTU_x-1$), ($CTU_y-1$ $CTU_x-1$) and ($CTU_y-1$, $CTU_x$). When the neighboring CTUs share encodings, the model is constructed using the best predictions as described below. Thus, it is possible for a model to select model parameters. FIG. 5A, FIG. 5B illustrates a common framework for mode implementation according to the invention.

Budget allocation is now described. Budget allocation refers to not only to bit allocation, but also quality and computational complexity allocation. For target rate, quality and computational complexity, the following are used: $R_{target}$, $Q_{target}$ and $T_{target}$. Bits per sample (all is referred as pixel in video encoding) is used for the rate, Peak Signal-to-Noise Ratio (PSNR), Mean of Square Error (MSE), and Sum of Square Error (SSE) for image quality, and nanoseconds per sample for computational complexity measurements. Performance budget allocation is based on the pre-computed mean absolute deviation (MAD) computed by the HEVC reference standard.

Bit allocation requires that encoding bits are assigned for each CTU. The bit allocation strategy is not simple average bit allocation for all CTUs. Instead, bit allocation is based on pre-computed MAD that also take into account uncontrolled, internal factors of the HEVC that are associated with live video streaming.

The required number of bits per pixel $bpp_{target}$ is estimated using:

$$bbp_{target} = \frac{R_{target}/f - HeaderBits}{N_{pixels}} \quad \text{Equation (3.1)}$$

where $R_{target}$ denotes the target number of bits per second for each video frame, f denotes the number of frames per second, $N_{pixels}$ denotes the number of pixels in each frame, and HeaderBits=25 are used for storing the header for HEVC intra-frame encoding. Each frame gets $R_{target}$ bits using:

$$R_{target} = N_{pixels} \cdot bbp_{target} \quad \text{Equation (3.2)}$$

Using $R_{coded}$, the total number of bits already used in the current frame, the number of bits remaining is estimated for the rest of the image using:

$$R_{left} = R_{target} - R_{coded} \quad \text{Equation (3.3)}$$

where $R_{left}$ denotes the number of bits allocated in the budget that are still available. With $R_{adj}$ referring to the budget correction needed to make based on mean absolute deviation (MAD) such that $R_{adj}$ is used as given by $$R_{allocated} = R_{left} - R_{adj} \quad \text{Equation (3.4)}$$

to modify the number of bits that have been allocated for the entire frame. The budget is adjusted using:

$$R_{adj} = R_{coded} - \left(1 - \frac{D_{left}}{D_{total}}\right) \cdot R_{target} \quad \text{Equation (3.5)}$$

where $D_{left}$ refers to the pre-computed MAD sum for the remaining CTUs, and $D_{total}$ refers to the total MAD allocated for the current frame. The goal of Equation 3.5 is to weight bit allocation to be proportional to the remaining MAD that needs to be accounted for. After encoding each CTU using Equation 3.5, $D_{left}$ gets reduced. $D_{left}$ should converge to zero. Thus, effectively, the use of Equation 3.5 is meant to ensure that the remaining CTUs get a number of bits that is proportional to their contribution towards the reduction of $D_{total}$ to zero. After updating $R_{allocated}$ by substituting Equation 3.5 into Equation 3.4, the number of bits is allocated for the current, i-th CTU using:

$$R_{target,i} = \left(\frac{D_i}{D_{remaining}}\right) \cdot R_{allocated} \quad \text{Equation (3.6)}$$

where $D_i$ refers to the MAD reduction associated with the i-th CTU, $D_{remaining}$ refers to the MAD still left to do for the entire frame.

Similar to bit allocation, the computational complexity budget for each CTU is based on the pre-computed MAD. The encoding time per pixel time_per_pixel$_{target}$ is computed using:

$$\text{time\_per\_pixel}_{target} = \frac{Time_{target}}{N_{pixels}} \quad \text{Equation (4.1)}$$

where Time$_{target}$ denotes the number of seconds allocated per frame. The total amount of time allocated to the entire frame $T_{target}$ is given by:

$$T_{target} = N_{pixels} \cdot \text{time\_per\_pixel}_{target} \quad \text{Equation (4.2)}$$

The amount of time left for encoding the remaining CTUs $T_{left}$ is given by:

$$T_{left} = T_{target} - T_{coded} \quad \text{Equation (4.3)}$$

where $T_{coded}$ refers to the total amount of bits already used. The allocated time for each CTU is adjusted using $T_{adj}$ given by:

$$T_{adj} = T_{coded} - \left(1 - \frac{D_{left}}{D_{total}}\right) \cdot T_{target} \quad \text{Equation (4.4)}$$

based on remaining MAD to cover, as done for the rate. The allocated time for entire CTU is similarly update using:

$$T_{allocated} = T_{left} - T_{adj} \quad \text{Equation (4.5)}$$

Finally, the amount of allocated for the CTU is given by its share of the remaining MAD:

$$T_{target,i} = \left(\frac{D_i}{D_{remaining}}\right) \cdot T_{allocated} \quad \text{Equation (4.6)}$$

Image quality is measured using the PSNR. At the CTU level, it is more efficient to work with the sum of squared error (SSE). Thus, there is a need to convert back and forth between PSNR and SSE budget requirements. As for rate and computational complexity, allocation is based on the MAD.

PSNR requirements are converted into SSE requirements using:

$$Q_{target} = SSE_{target} = \frac{2^{2 \cdot bitDepth} \cdot N_{pixels}}{10^{PSNR/10}} \quad \text{Equation (5.1)}$$

where SSE$_{target}$ refers to the allocated SSE for the entire frame, and bitDepth refers to the number of bits used to represent each pixel. After encoding a CTU, the remaining SSE budget is similarly given by:

$$Q_{left} = Q_{target} - Q_{coded} \quad \text{Equation (5.2)}$$

Adjustments are similarly made using:

$$Q_{adj} = Q_{coded} - \left(1 - \frac{D_{left}}{D_{total}}\right) \cdot Q_{target} \quad \text{Equation (5.3)}$$

and $$Q_{allocated} = Q_{left} - Q_{adj} \quad \text{Equation (5.4)}$$

Also, the CTU SSE is given by:

$$SSE_{target,i} = \left(\frac{D_i}{D_{remaining}}\right) \cdot SSE_{allocated} \quad \text{Equation (5.5)}$$

Significant content variation can lead to mis-prediction of the required budgets for each frame. In such cases, no action is taken if the variations stay within the budgets. However, when mis-prediction results in budget deficits, the remaining budget needs to be reallocated to avoid significant artifacts in the reconstructed video. Thus, after the budget is used up, the remaining budget needs to be adjusted to minimize the budget violation.

Budget violations are reduced by reducing the estimates of the remaining budget using:

$$B_{adj} = \alpha \cdot (D_{i,left}/D_i) \cdot B_{target} \quad \text{Equation (6.1)}$$

$$T_{adj} = \alpha \cdot (D_{i,left}/D_i) \cdot T_{target} \quad \text{Equation (6.2)}$$

$$SSE_{adj} = \alpha \cdot (D_{i,left}/D_i) \cdot SSE_{target} \quad \text{Equation (6.3)}$$

where $\alpha$ was set to 0.15 after experimenting with different videos. Clearly, $\alpha=0$ would lead to significant artifacts while $\alpha=1$ would not attempt to minimize budget violations and would thus allow significant changes in video content to violate the constraints.

The rate-quality-complexity model is spatially adapted to the input video content. A linear model is built based on the encoding of three neighboring CTUs as depicted in FIG. 4.

With i=1, 2, 3 denote the neighboring CTUs and each CTU encoded using the pair of ($QP_i$, $Config_i$) to results in ($SSE_i$, $T_i$, $R_i$). To estimate the linear model, the parameter matrix A is defined using:

$$A = \begin{bmatrix} a1 & b1 & c1 \\ a2 & b2 & c2 \\ a3 & b3 & c3 \end{bmatrix} \quad \text{Equation (7.1)}$$

Then the basic linear model is described by:

$$\begin{bmatrix} SSE_i \\ T_i \\ R_i \end{bmatrix} = \begin{bmatrix} a1 & b1 & c1 \\ a2 & b2 & c2 \\ a3 & b3 & c3 \end{bmatrix} \begin{bmatrix} QP_i \\ Config_i \\ 1 \end{bmatrix} \quad \text{Equation (7.2)}$$

Suppose that the 3 CTU encodings use 3 different pairs of ($QP_i$, $Config_i$). In this case, it is expected that the 3 rows of [$QP_i$, $Config_i$, 1] should also be linearly independent since the ranges of QP and Config are quite different. Thus, when working with three different CTU encodings, the parameters can be estimated using:

$$\begin{bmatrix} a1 \\ b1 \\ c1 \end{bmatrix} = \begin{bmatrix} QP_1 & Config_1 & 1 \\ QP_2 & Config_2 & 1 \\ QP_3 & Config_3 & 1 \end{bmatrix}^{-1} \begin{bmatrix} SSE_1 \\ SSE_2 \\ SSE_3 \end{bmatrix} \quad \text{Equation (7.3)}$$

$$\begin{bmatrix} a2 \\ b2 \\ c2 \end{bmatrix} = \begin{bmatrix} QP_1 & Config_1 & 1 \\ QP_2 & Config_2 & 1 \\ QP_3 & Config_3 & 1 \end{bmatrix}^{-1} \begin{bmatrix} T_1 \\ T_2 \\ T_3 \end{bmatrix} \quad \text{Equation (7.4)}$$

$$\begin{bmatrix} a3 \\ b3 \\ c3 \end{bmatrix} = \begin{bmatrix} QP_1 & Config_1 & 1 \\ QP_2 & Config_2 & 1 \\ QP_3 & Config_3 & 1 \end{bmatrix}^{-1} \begin{bmatrix} R_1 \\ R_2 \\ R_3 \end{bmatrix} \quad \text{Equation (7.5)}$$

For robust model update, the case is also considered when the neighboring CTUs do not use 3 independent encodings. In this case, [$a_i$ $b_i$ $c_i$] is selected as associated with the best predictions. To implement this approach, for the i-th CTU, the prediction errors are computed using:

$$SSE_{error,i} = |SSE_i - a_1 \cdot QP_i - b_1 \cdot Config_i - c_1|$$

$$R_{error,i} = |R_i - a_2 \cdot QP_i - b_2 \cdot Config_i - c_2|$$

$$T_{error,i} = |T_i - a_3 \cdot QP_i - b_3 \cdot Config_i - c_3|$$

Figure 6:
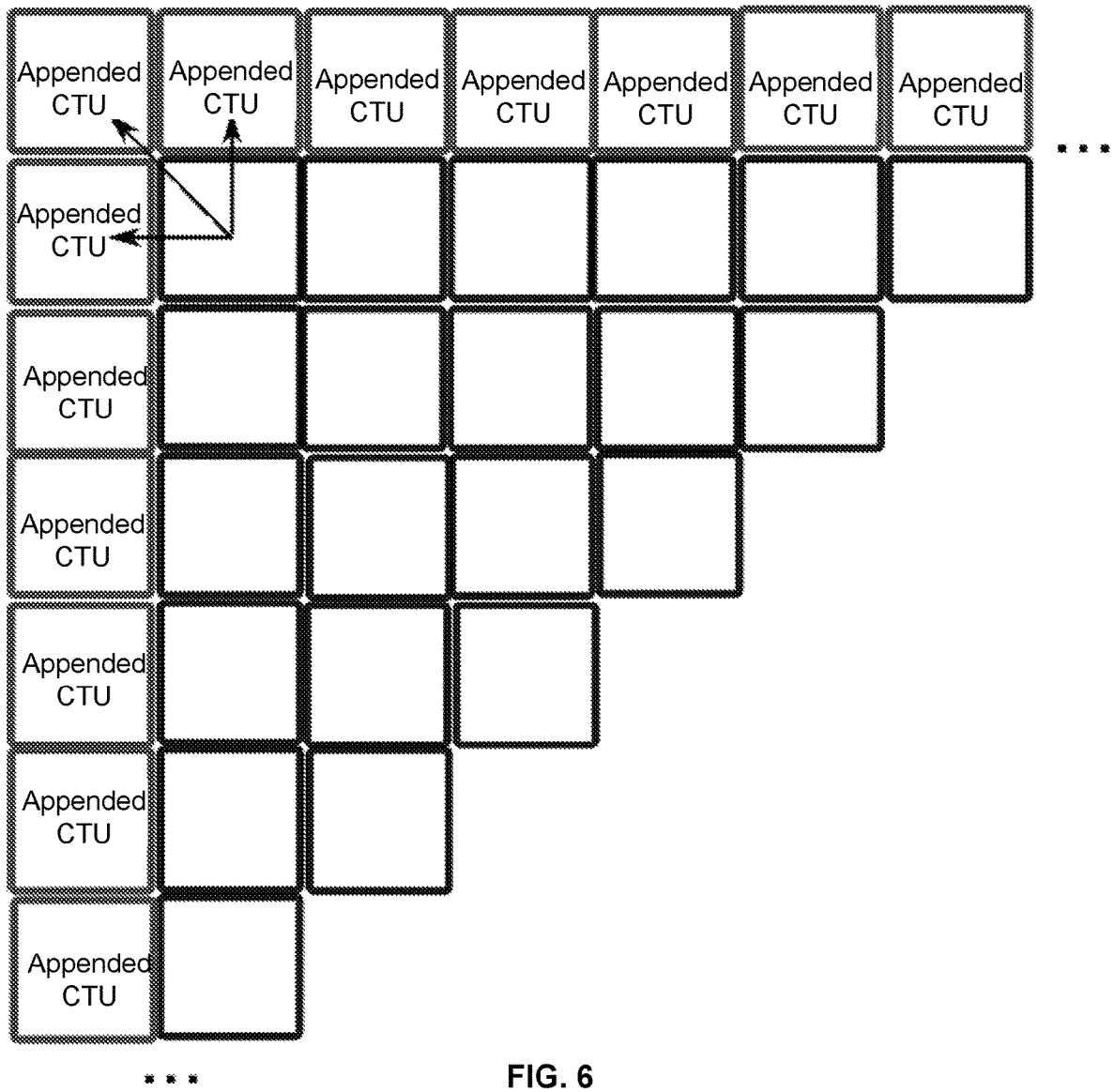

The model is then built by using the coefficients associated with the minimum prediction errors. For example, for $A_{1,i} = [a_{1,i}\ b_{1,i}\ c_{1,i}]$, the following is solved:

$$\min_i SSE_{error,i} \quad \text{Equation (7.6)}$$

and $A_{1,j}$ is used to associate with j-th CTU model that minimizes Equation 7.6 (see also FIG. 4). Another problem occurs in coming up with an initial model for the first row and first column in each frame. For this case, virtual CTUs are created above the first row and to the left of the first column as shown in FIG. 6. The virtual CTU encodings assume the Pareto front that is initialized from other videos and then updated based on the encodings of the first few frames of the current video.

More specifically, for each virtual CTU, the Pareto front based is computed on the average of the current encodings. According to one embodiment, and initial model trained on other videos may be used. After a few frames, the Pareto front is computed from the current video. Here, it is noted that the Pareto front is obtained through an exhaustive evaluation of all possible Config and QP values. However, the cost of estimating the Pareto front is restricted to CTUs over a few frames and offline computations using other videos.

Updated linear models are used to estimate values for QP and Config that can satisfy the constraints and minimize bitrate, maximize quality, or minimize computational complexity. In addition, the invention provides a robust approach for minimizing constraint violations.

The minimum bitrate mode is used to demonstrate the basic concepts. All other models are similar. As explained above, the constraints are used to determine target values for Q, T, R as needed. For the minimum bitrate mode, it is desired to match the constraints on quality $Q_{target}$ and time $T_{target}$. The linear model is used to determine the encoding parameters:

$$\begin{bmatrix} Q_{target} \\ T_{target} \end{bmatrix} = \begin{bmatrix} a1 & b1 & c1 \\ a2 & b2 & c2 \end{bmatrix} \begin{bmatrix} QP_i \\ Config_i \\ 1 \end{bmatrix} \quad \text{Equation (8.1)}$$

Using Equation 8.1, the initial values of the encoding parameters are estimated using:

$$\begin{bmatrix} QP_{est} \\ Config_{est} \end{bmatrix} = \begin{bmatrix} a1 & b1 \\ a2 & b2 \end{bmatrix}^{-1} \cdot \begin{bmatrix} Q_{target} - c1 \\ T_{target} - c2 \end{bmatrix} \quad \text{Equation (8.2)}$$

$QP_{est}$ and $Config_{est}$ are rounded to the nearest integer values and the model used as given by:

$$Q = a_1 \cdot QP + b_1 \cdot Config + c_1$$

$$T = a_2 \cdot QP + b_2 \cdot Config + c_2$$

$$R = a_3 \cdot QP + b_3 \cdot Config + c_3 \quad \text{Equation (8.3)}$$

to perform a local search with QP ∈ [QP$_{est}$−2, QP$_{est}$+2] and Config ∈ [Config$_{est}$−2, Config$_{est}$+2] for the minimum bitrate that also satisfies the constraints. Alternatively, if no parameters can satisfy the constraints, the normalized constraint violations is computed using:

$$norm(X) = \frac{X - X_{min}}{X_{mean}} \quad \text{Equation (8.4)}$$

Then, a (QP, Config) pair is selected that minimizes the total normalized constraint violation as given in FIG. 8 for the minimum bitrate mode.

Similarly, for the maximum quality mode, the target budget values are first used for bitrate and performance to determine initial estimates and select optimal encoding parameters based on local search or minimum constraint violation. Then, for the minimum computational complexity mode, the target bitrate and quality is used for the initial search.

While the linear model is simple and robust, it can fail to produce valid values for QP and Config. This failure occurs because the linear model does not impose any restrictions on the constraints. Thus, the constraints end up being significantly above or below the rate-performance-quality surface. When the constraints are significantly off, they are automatically modifies to bring them close to the control surface.

For valid encodings, it is required that QP ∈ [0, 51] and Config ∈ [0, 13]. When either parameter falls out of range, the constraints are modified to produce valid encodings.

In general, rate, constraint, and computation complexity are non-linearly related. The linear model according to the invention is excellent for local approximations to the non-linear relationship.

The relationship between any pair of constraints is provided using:

$$T = a1 \cdot SSE^{b1}, \; a1>0, \; b1<0.$$

$$SSE = a2 \cdot R^{b2}, \; a2>0, \; b2<0.$$

$$T = a3 \cdot R^{b3}, \; a3>0, \; b3>0. \quad \text{Equation (8.5)}$$

Figure 7:
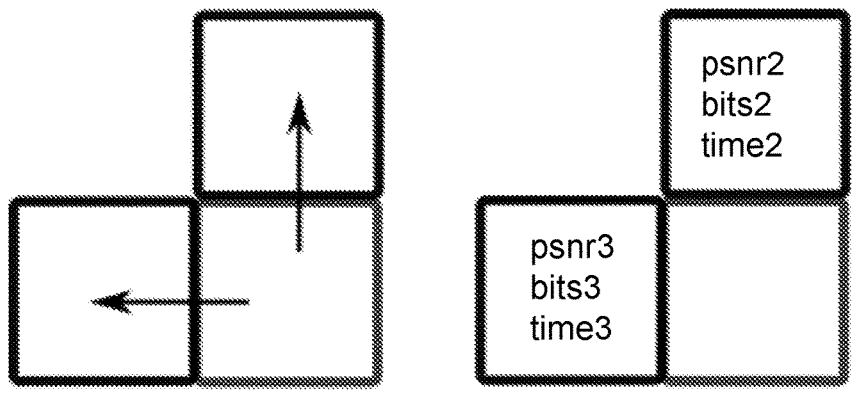

Following are explanations of how to modify the constraints for the minimum rate algorithm. As for the linear model, the neighboring CTU encodings are used to adaptively estimate the relationships between the constraints as shown in FIG. 7.

The main algorithm for estimating $T = a \cdot SSE^b$ is given in FIG. 9. Based on the relationship, either the quality or the computational complexity constraint is moved to lie on the curve as given in FIG. 10. Similarly, for the minimum computational complexity mode, $SSE = a \cdot R^b$ is estimated as given in FIG. 11 and the constraints updated as given in FIG. 12. The model update and algorithm for the maximum quality (minimum distortion) model is given in FIG. 13 and FIG. 14.

To account for the case of failing to estimate the model, for example, if the left and top CTUs are encoded in the same way, the configuration from the last CTU is used. Similarly, if the constraint update is excessive, the configuration from the last CTU may also be used.

The updated constraints are used for estimating new, valid values for QP and Config. Large changes are prevented by requiring that the QP to remain within ±4 of the average of the neighboring CTUs. Furthermore, the final encoding parameters are forced to stay within the valid ranges.

One embodiment of the invention is applied to a dynamic reconfiguration example referred to above as the standard RaceHorsesC to demonstrate the advantages of the invention. Specifically, the goal of the following example is to demonstrate the ability to switch from a low profile mode to a medium and then back to a high profile mode.

The low, medium, and high profiles are defined by fixing QP to QP=37, 32 and 27, respectively. Furthermore, for comparing to the proposed approach, for controlling both the bitrate and PSNR, the full range depth configuration (config=13) is used and the resulting PSNR constraints reduced a little bit to generate the low, medium, and high profiles.

Figure 15:
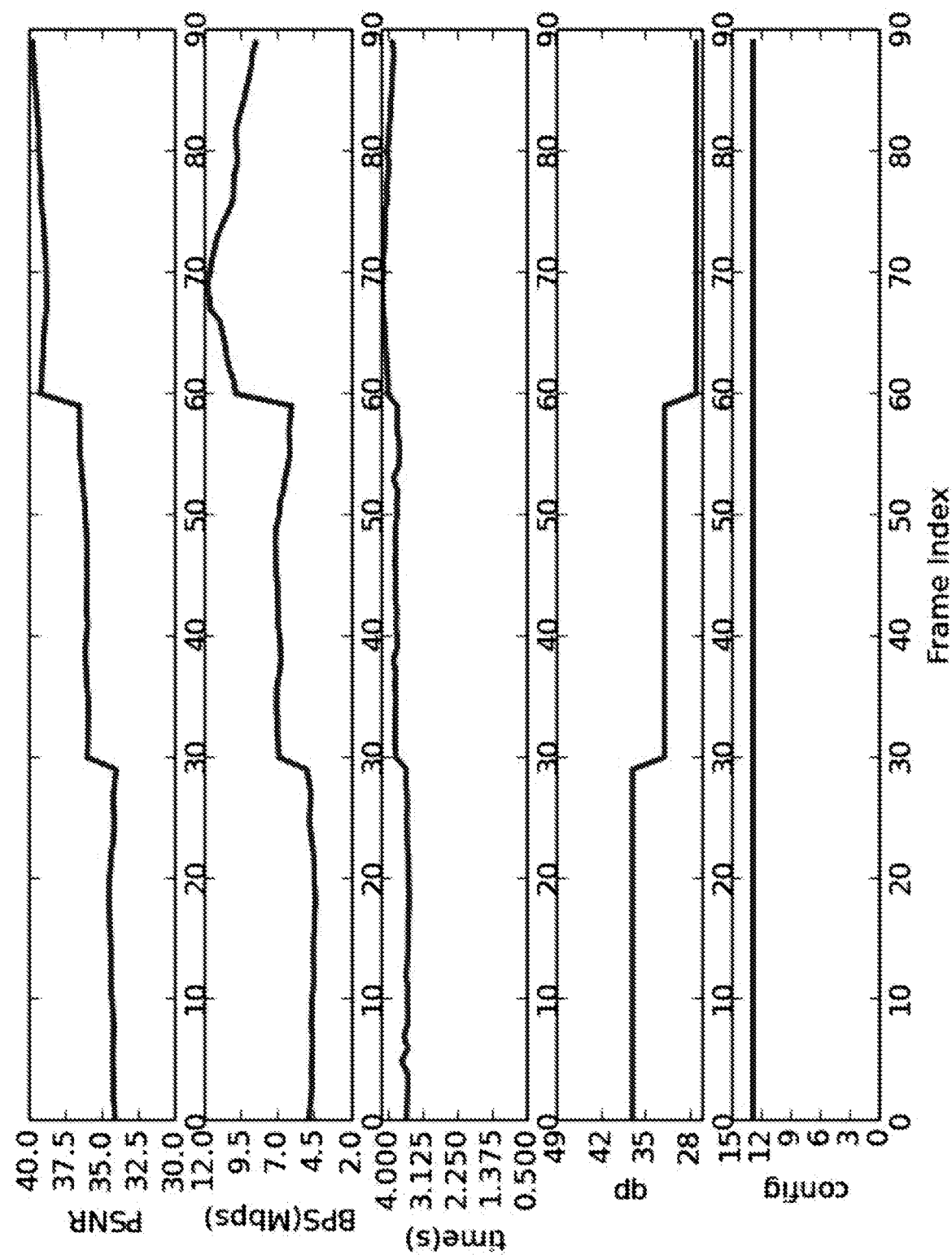
Figure 16:
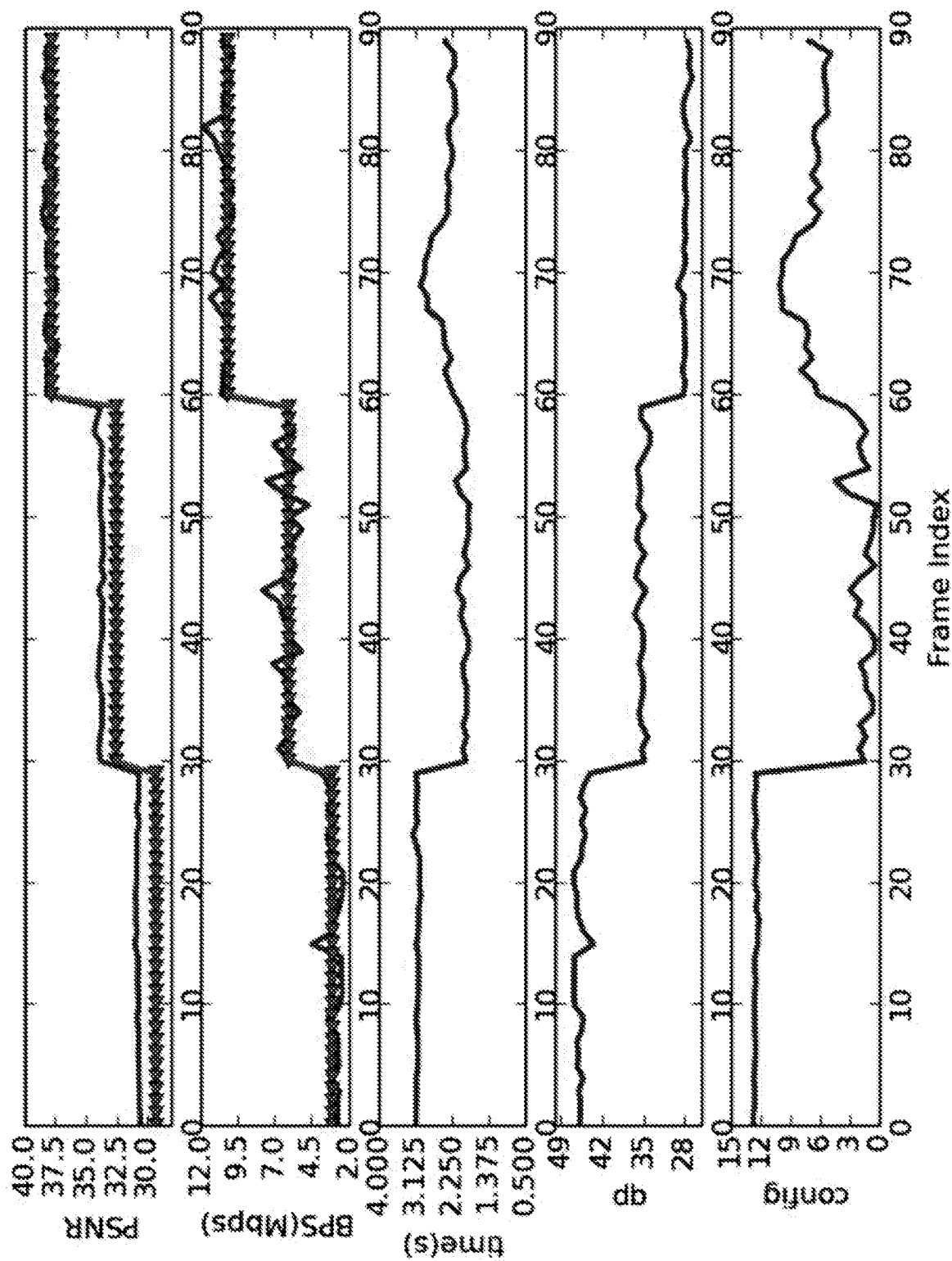

The results are compared for the fixed QP configuration shown in FIG. 15 with the minimum computational complexity mode according to the invention shown in FIG. 16. For constraint satisfaction, mild violations may be allowed in the order of 10% of the constraints. As shown in FIG. 16, it can be seen that DRASTIC control achieves constraint satisfaction at the high rates of 93% for low, 83% for medium, and 93% for the high profile. Furthermore, compared to the fixed QP results, the invention achieves savings of 13% for the low, 49% for the medium, and 40% for the high profile. The invention proves not only to meet given constraints, but while also minimizing the encoding time.

FIG. 17 illustrates a flow chart of an offline process 200 of video encoding and forward model creation for inter-coding according to the invention. With the objective to determine a suitable model to be used to determine the most relevant encoding configuration parameters that affect video quality, bitrate, and frame rate, videos at step 202 are encoded at step 204.

To determine a suitable model for each of the afore-described encoded video characteristics a linear regression model is employed at step 206 to identify and select the most important encoding parameters (profile, encoding structure, GOP structure, QP, max intra period) to construct the relevant forward model. Stepwise regression is used to both select important parameters as well as reduce the dimensionality of the encoding parameter vectors to determine at step 208 the following optimal models:

$$\log(SSIM) = a_0 \cdot QP + b_0$$

$$\log(Bitrate) = a_1 \cdot QP + b_1$$

$$\log(FPS) = a_2 \cdot QP + b_2 \quad \text{Equation (9.1)}$$

FIG. 18 illustrates pseudo code of the offline process of video encoding and forward model creation for inter-coding according to the invention.

Figure 19:
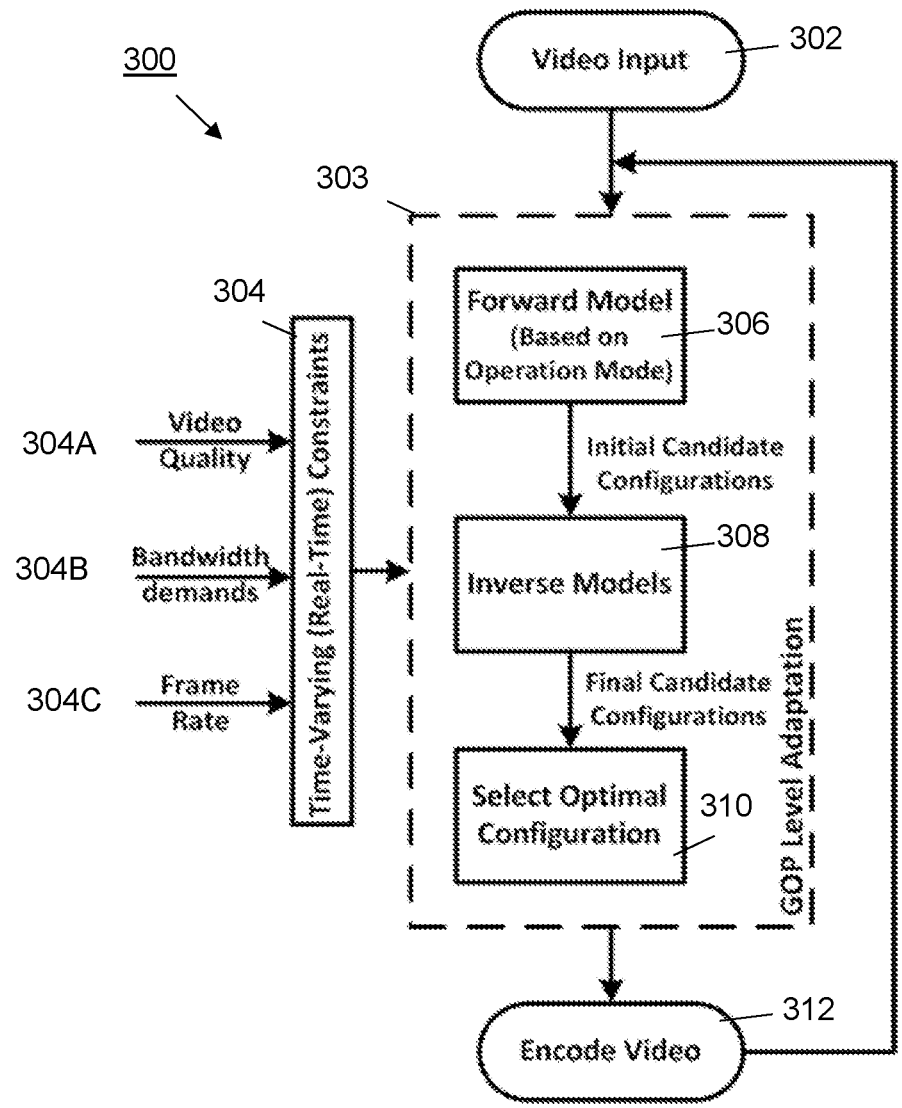

FIG. 19 illustrates a flow chart of a real-time adaptation 300 using time-varying constraints for inter-coding according to the invention. For each of the three forward models shown in Equation 9.1, an inverse process is applied at step 308 to predict the optimal quantization parameter values that meet the input constraints. According to one embodiment, Newton's algorithm may be used to find a solution to the forward model that describes the most dominant constraint. Depending on the employed mode of operation (minimum computational complexity mode, the maximum quality mode, and the minimum bitrate mode), mild violations may be allowed. For example, either in the order of −10% for maximum quality mode and frame rate models or in the order of +0.5% for the minimum bitrate models. When more than one solution in terms of QP is generated, the results are rounded up to the nearest integer QP value since the output is a continuous numerical value as shown by FIG. 19. By adopting this inverse process, some QP predictions may be found outside from the range of QP used in the encoding parameters such that additional configurations may be ran in order to complete the missing values of SSIM, bitrate and frame rate for the missing predicted QPs. FIG. 20 illustrates pseudo code of the real-time adaptation using time-varying constraints for inter-coding according to the invention.

While the disclosure is susceptible to various modifications and alternative forms, specific exemplary embodiments of the invention have been shown by way of example in the drawings and have been described in detail. It should be understood, however, that there is no intent to limit the disclosure to the particular embodiments disclosed, but on the contrary, the intention is to cover all modifications, equivalents, and alternatives falling within the scope of the disclosure as defined by the appended claims.

The invention claimed is:

1. A method for real-time adaptive encoding digital video signals comprising:
   (a) receiving an input video comprising a plurality of video segments;
   (b) applying, to a video segment, real-time input constraints on: (1) video quality remaining above a minimum value Q, (2) bandwidth with bitrate remaining below a maximum value representing available bitrate, and (3) encoding frame rate with a number of frames per second (FPS) remaining above a minimum encoding rate value, to select initial candidate encoding configurations, wherein applying further comprises using pre-computed forward regression models, wherein the pre-computed forward regression models can vary based on an encoding scheme, and are given by:

$\log(Q) = a_0 + b_0 \cdot QP + c_0 \cdot QP^2,$ $\log(\text{Bitrate}) = a_1 + b_1 \cdot QP + c_1 \cdot QP^2,$ $\log(\text{FPS}) = a_2 + b_2 \cdot QP + c_2 \cdot QP^2,$     Equation (9.1)

wherein QP is a quantization parameter and $a_0$, $b_0$, $c_0$, $a_1$, $b_1$, $c_1$, $a_2$, $b_2$, $c_2$ represent regression coefficients determined using a training process that uses video segments similar to the video segments of the plurality;
   (c) using the pre-computed forward regression models to derive inverse models to determine final candidate encoding configurations from the initial candidate encoding configurations;
   (d) selecting an optimal encoding configuration from the final candidate encoding configurations, wherein the optimal encoding configuration satisfies constraints and achieves a maximum video quality, a minimum bandwidth, or a maximum frame rate, wherein the optimal encoding configuration comprises of a Group of Pictures (GOP) configuration and a Coding Tree Unit (CTU) configuration;
   (e) encoding the video segment using the optimal encoding configuration; and
   (f) repeating (b)-(e) for all video segments of the plurality of video segments.

2. The method of claim 1 further comprising creating off-line the pre-computed forward regression models.

3. The method of claim 2, wherein creating further comprises:
   inputting a plurality of videos that is composed of video segments;
   encoding each video segment using different video encoding parameters, Coding Tree Unit configurations, and GOP configurations;
   evaluating the video quality, required bitrate, and video encoding rate in frames per second for each video segment; and
   learning the forward regression models that map the video encoding parameters, Coding Tree Unit configurations, and GOP configurations to the video quality, required bitrate, and video encoding rate over a training set of video segments.

4. The method of claim 1, wherein the inverse models use Newton's algorithm to determine final candidate encoding configurations from the forward regression models and constraints on video quality, maximum bitrate, and minimum video encoding rate.

5. The method of claim 1, wherein the optimal encoding configuration is one selected from the group: a maximum video encoding performance mode, a minimum bitrate mode, and a maximum video quality mode.

6. The method of claim 5, wherein the maximum performance mode is defined according to:

$$\min_{c \in C} T \text{ subject to}: (Q \geq Q_{min}) \, \&(R \leq R_{max})$$

with C representing a set of video encoding configurations, R representing a number of bits per pixel, T representing encoding time per frame, and Q representing a measure of video quality.

7. The method of claim 5, wherein the minimum bitrate mode is defined according to:

$$\min_{c \in C} R \text{ subject to}: (Q \geq Q_{min}) \, \&(T \leq T_{max})$$

with C representing a set of video encoding configurations, R representing a number of bits per pixel, T representing encoding time per frame, and Q representing a measure of video quality.

8. The method of claim 5, wherein the maximum quality mode is defined according to:

$$\min_{c \in C} Q \text{ subject to}: (T \leq T_{max}) \, \&(R \leq R_{max})$$

with C representing a set of video encoding configurations, R representing a number of bits per pixel, T representing encoding time per frame, and Q representing a measure of video quality.

9. The method of claim 1, wherein the forward regression model is defined in terms of a quantization parameter (QP), the GOP configuration, and the Coding Tree Unit configuration.

10. The method of claim 1, wherein video constraints and the optimization modes are applied individually in a CTU or a GOP while staying within a budget.

11. The method of claim 10, wherein the budget comprises a target bitrate ($R_{target}$) of a number of bits per second for each video frame according to the equation:

$R_{target} = N_{pixels} \cdot bbp_{target}$ wherein $N_{pixels}$ is a number of pixels in each frame and $bbp_{target}$ is a required number of bits per pixel.

12. The method of claim 10, wherein the budget comprises a target frame rate ($T_{target}$) of a total amount of time allocated to an entire frame according to the equation:

$$T_{target} = N_{pixels} \cdot \text{time\_per\_pixel}_{target}$$

wherein $N_{pixels}$ is a number of pixels in each frame and $\text{time\_per\_pixel}_{target}$ is an encoding time per pixel.

13. The method of claim 10, wherein the budget comprises a target video quality ($Q_{target}$) of a sum of squared error (SSE) for an entire frame according to the equation:

$$Q_{target} = \frac{2^{2 \cdot bitDepth} \cdot N_{pixels}}{10^{PSNR/10}}$$

wherein bitDepth is a number of bits used to represent each pixel, $N_{pixels}$ is a number of pixels in each frame and PSNR is Peak Signal-to-Noise Ratio.

14. The method of claim 1, wherein (a)-(f) are applied to different video segments in a video delivery system, wherein the video delivery system can support live and on demand settings.

15. The method of claim 14, wherein the video delivery system includes adaptive HTTP streaming (e.g., MPEG-DASH protocol) and RTP protocol based systems.

16. The method of claim 1, wherein the encoding scheme comprises a GOP configuration.

17. The method of claim 1, wherein the encoding scheme comprises encoding parameters that do not include QP.

18. The method of claim 1, wherein the video quality is one selected from the group: structural similarity index measure (SSIM), peak signal-to-noise ratio (PSNR), and video multimethod assessment fusion (VMAF).

* * * * *